(12) United States Patent
Svedberg (10) Patent No.: US 8,181,570 B2
(45) Date of Patent: May 22, 2012

(54) PLUG SCREW FEEDER FOR FEEDING CELLULOSE PULP/CHIPS

(75) Inventor: Peter Svedberg, Alnö (SE)

(73) Assignee: Metso Paper, Inc. (FI)

( * ) Notice: Subject to any disclaimer, the term of this patent is extended or adjusted under 35 U.S.C. 154(b) by 221 days.

(21) Appl. No.: 12/665,818

(22) PCT Filed: Apr. 16, 2008

(86) PCT No.: PCT/SE2008/050428
§ 371 (c)(1),
(2), (4) Date: Dec. 21, 2009

(87) PCT Pub. No.: WO2009/005441
PCT Pub. Date: Jan. 8, 2009

(65) Prior Publication Data
US 2010/0186609 A1 Jul. 29, 2010

(30) Foreign Application Priority Data
Jun. 29, 2007 (SE) ........................................ 0701594

(51) Int. Cl.
*B30B 9/12* (2006.01)
*D21C 7/06* (2006.01)
(52) U.S. Cl. ........................................ 100/117; 100/337
(58) Field of Classification Search ................... 100/117, 100/145, 146, 337; 210/173, 174, 413; 99/495, 99/510
See application file for complete search history.

(56) References Cited

U.S. PATENT DOCUMENTS

| 4,150,617 | A | * | 4/1979 | Schramm et al. ............. 100/117 |
| 4,165,283 | A |  | 8/1979 | Weber et al. |
| 4,256,035 | A |  | 3/1981 | Neufeldt |
| 5,390,592 | A |  | 2/1995 | Schnell et al. |
| 6,854,382 | B2 | * | 2/2005 | Jan ................................. 99/510 |
| 7,357,074 | B2 | * | 4/2008 | Kraft et al. .................... 100/117 |
| 2006/0196370 | A1 |  | 9/2006 | Kraft et al. |

OTHER PUBLICATIONS

International Search Report based on PCT/SE2008/050428, dated Feb. 10, 2008, 4 pgs.

* cited by examiner

*Primary Examiner* — Jimmy T Nguyen
(74) *Attorney, Agent, or Firm* — Lerner, David, Littenberg, Krumholz & Mentlik, LLP (57) ABSTRACT

A screw pipe unit intended to cooperate with and at least partly enclose a screw in a plug screw feeder for cellulose chips/pulp is provided. The screw pipe unit comprises a plurality of openings for filtrate dewatered from the chips/pulp in the screw pipe when the plug screw feeder is in operation. The screw pipe is, on at least a portion of its inner surface, provided with bars inclined with respect to the longitudinal axis of the screw pipe. The angle of inclination of the bars decreases in the longitudinal direction, from a first portion of the screw pipe unit with maximum inclination to a second portion of the screw pipe unit with bars substantially parallel to the axis, the second portion being further away from the inlet end of the screw pipe unit than the first portion.

15 Claims, 6 Drawing Sheets

PLUG SCREW FEEDER FOR FEEDING CELLULOSE PULP/CHIPS

CROSS-REFERENCE TO RELATED APPLICATIONS

The present application is a national phase entry under 35 U.S.C. §371 of International Application No. PCT/SE2008/050428 filed Apr. 16, 2008, published in English, which claims priority from Swedish Application No. 0701594-4 filed Jun. 29, 2007, all of which are incorporated herein by reference.

FIELD OF THE INVENTION

The present invention relates to a plug screw feeder for feeding cellulose pulp/chips.

BACKGROUND OF THE INVENTION

In the pulp and paper industry, plug screw feeders are well known devices used in different applications for transporting cellulose pulp/chips in such way that a plug is formed, sealing against a higher (or lower) pressure at the output end of the feeder. The plug transport is achieved by means of a screw interacting with some kind of pipe member, often referred to as screw pipe. The screw pipe may, for example, present a tapering shape.

It is often desirable to dewater the material transported in the plug screw feeder, and openings may be provided in the screw pipe for the dewatered liquid. There can also be another pipe unit, such as a slotted plug pipe, arranged downstream of the screw pipe (in the feed direction), to prolong the dewatering zone.

In a number of known plug screw devices, straight bars are provided on the inner surface of the plug screw feeder (or the screw pipe). Similarly, straight bars may be provided on the inner surface of the subsequent pipe unit (e.g. the slotted plug pipe).

It has been proposed to make the bars of the screw pipe spiral-shaped, such as in the SpiralThroat™ product by Metso Paper. The bars are then inclined with respect to the longitudinal axis of the screw pipe, and the degree of inclination is typically the same throughout the screw pipe, or can be slightly increasing towards the end of the screw pipe. By means of screw pipes with spiral bars, an improved feeding effect is achieved. However, such spiral screw pipes result in less efficient dewatering. Furthermore, spiral screw pipes could be inappropriate for use together with known types of slotted plug pipes with straight bars.

Accordingly, there is a need for an improved plug screw feeder providing efficient feeding and dewatering of the transported pulp/chips.

One object of the present invention is to provide an improved apparatus for feeding cellulose pulp/chips. A specific object is to provide a screw pipe for a plug screw feeder by means of which both efficient feeding and efficient dewatering can be achieved. Another object of the present invention is to provide a screw pipe suitable for use together with slotted plug pipes with straight bars.

SUMMARY OF THE INVENTION

In accordance with the present invention, these and other objects have now been attained by the invention of a screw pipe having a longitudinal axis, an inner surface, a first portion corresponding to an inlet end and a second portion distal from the first portion towards an outlet end, for at least partly enclosing a screw in a screw plug feeder for cellulosic material, the screw pipe including at least one opening between the inlet end and the outlet end for the removal of filtrate dewatered from the cellulosic material, and a plurality of bars disposed on the inner surface, the plurality of bars being inclined with respect to the longitudinal axis of the screw pipe at an angle of inclination with respect to the longitudinal axis of the screw pipe which decreases in the longitudinal direction from the inlet end to the outlet end, the angle of inclination of the plurality of bars at the first portion of the screw pipe comprising a maximum angle of inclination, and the plurality of bars at the second portion of the screw pipe being substantially parallel to the longitudinal axis of the screw pipe. In a preferred embodiment, the plurality of bars at the first portion of the screw pipe are substantially helical.

In accordance with another embodiment of the screw pipe of the present invention, the angle of inclination of the plurality of bars gradually decreases from the first portion of the screw pipe to the second portion of the screw pipe, and preferably the angle of inclination gradually substantially continuously decreases from the first portion of the screw pipe to the second portion of the screw pipe. In another embodiment, however, the angle of inclination gradually decreases in the form of a plurality of steps from the first portion of the screw pipe to the second portion of the screw pipe.

In accordance with another embodiment of the screw pipe of the present invention, the angle of inclination of the plurality of bars in the first portion of the screw pipe comprises an angle of from 10° to 60°, and preferably an angle of from 15° to 35°.

In accordance with another embodiment of the screw pipe of the present invention, the screw pipe comprises a single pipe element.

In accordance with another embodiment of the screw pipe of the present invention, the screw pipe comprises a plurality of pipe elements coupled together in series.

In accordance with another embodiment of the screw pipe of the present invention, the screw pipe comprises a plurality of pipe elements coupled together longitudinally.

In accordance with the present invention, a screw pipe feeder has also been provided for feeding cellulosic material comprising a screw and the screw pipe discussed above. In accordance with one embodiment of the plug screw feeder of the present invention, it includes a plug pipe having an inner surface connected to the screw pipe, the plug pipe including a plurality of bars disposed on the inner surface substantially parallel to the longitudinal axis of the screw pipe.

In accordance with another embodiment of the plug screw feeder of the present invention, the plug screw feeder includes a processing unit for feeding the cellulosic material from the screw pipe thereto. In a preferred embodiment, the processing unit is a refiner, a preheater or an impregnator.

In accordance with the present invention, use of a plug screw feeder discussed above has been provided for feeding cellulosic material to a refiner.

In accordance with the present invention a screw pipe unit is proposed which has bars inclined or spiral shaped at the beginning or inlet end and then in which the inclination decreases in the feed direction such that the bars are substantially straight and parallel to the longitudinal axis at a portion of the screw pipe closer to the outlet end of the screw pipe. The pulp/chip flow is efficiently fed through the improved feeding effect of the inclined bars at a first portion of the screw pipe and at a later stage in the screw pipe the dewatering properties increase. Thus, the pulp/chips can be efficiently fed and dewatered by means of one and the same plug screw feeder.

Preferred embodiments of the present invention relate to a screw pipe unit with a gradual decrease in the bar inclination (stepwise or continuously), thus avoiding the risk that comparatively abrupt change(s) in the degree of inclination will affect the shape and other properties of the plug in a negative manner.

A screw pipe in accordance with the present invention with straight or almost straight bars near the pipe output end is suitable for being connected e.g. to a slotted plug pipe with straight bars, whereby the plug formation and dewatering is further improved.

According to one embodiment of the present invention, bars of a screw pipe unit are substantially helical in a first portion of the screw pipe unit.

According to other aspects of the present invention there are provided a plug screw feeder comprising a screw pipe unit, a system for treatment of cellulose chips/pulp comprising a screw pipe unit, and a use of a screw pipe unit.

According to one embodiment of the present invention, a plug screw feeder of the invention comprises a screw pipe unit connected to a plug pipe unit with substantially straight bars, the screw pipe unit and the plug pipe unit being arranged with substantially non-interrupted straight bars in the area where the screw pipe unit is connected to the plug pipe unit.

BRIEF DESCRIPTION OF THE DRAWINGS

The present invention, together with further objects and advantages thereof, may best be understood by reference to the following detailed description, which refers to the appended drawings, in which.

DETAILED DESCRIPTION

The following detailed description refers to the drawings, in which similar or corresponding elements will be denoted by the same reference numbers.

Figure 1:
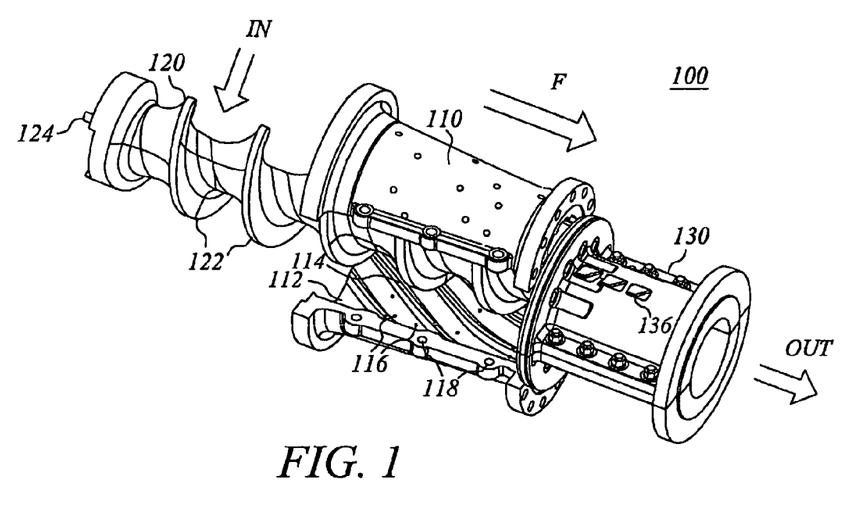
FIG. 1 is a side, partially schematic, partially exploded, perspective view illustrating components of a plug screw feeder in which the present invention may be used.
Figure 1A:
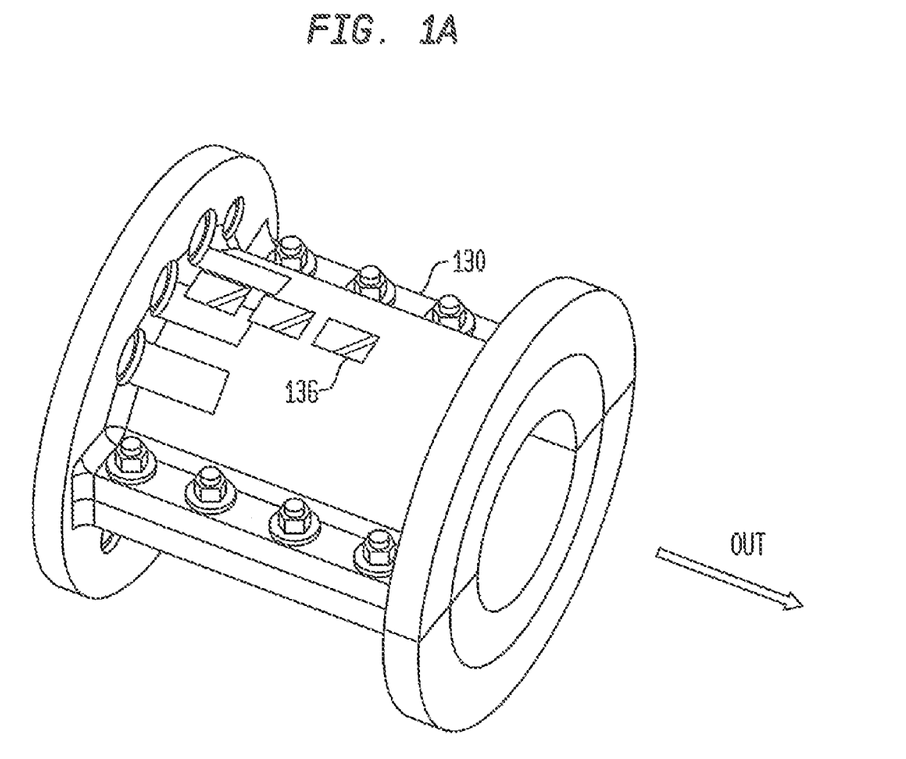
FIG. 1A is a partially schematic, perspective view illustrating a portion of the plug screw feeder shown in FIG. 1.

Referring first to FIG. 1, this figure shows key components of a plug screw feeder in which the present invention can be used. The plug screw feeder 100 (sometimes also referred to as screw conveyor, transport screw, etc.) comprises a screw pipe 110, a screw 120 (also referred to e.g. as feed screw or plug screw), and a plug pipe 130. Cellulose pulp or chips, depending on the application in which the plug screw feeder 100 is used, in the illustrated example as input to the horizontal plug screw feeder from above, to reach an input end of the screw pipe. This is schematically indicated by the block arrow IN. The screw 120 is rotated about shaft 124 arranged along the longitudinal axis of the plug screw feeder 100, whereby cooperation between the screw 120 and enclosing screw pipe 110 causes a feeding effect and generally also creates a plug flow. To facilitate the creation of a plug flow, the screw pipe 110 of the illustrated embodiment has an inner diameter that decreases in the feed direction F while the screw 120 has a substantially constant core diameter. By the term core diameter is meant the diameter of the screw if the threads were removed, i.e. the diameter in the parts between the threads. The outer diameter of the screw 120 decreases in the feed direction, in order to fit within the inner diameter of the screw pipe 110. The same effect may alternatively be achieved by a screw pipe with a constant inner diameter enclosing a screw that has a core diameter that increases in the feed direction. In that case, the outer diameter of the screw is constant. Combinations of these variants are also possible.

The plug pipe 130 in the illustrated embodiment is connected to the screw pipe 110 at the output end thereof, so as to prolong the area of plug flow. Normally, the screw pipe 110 encloses a threaded portion of the screw 120, while there are no screw threads 122 on the part of the screw 120 enclosed by the plug pipe 130. The screw pipe 110 is provided with openings (holes, slots, or the like) 116 for liquid which is dewatered from the pulp/chips in the plug screw feeder 100. To prolong the dewatering zone, the plug pipe 130 may also be provided with openings. In the example of FIG. 1, the plug pipe 130 has slots 136 in a first portion thereof, as seen the in feed direction F. The plug screw feeder comprises means for collecting the liquid that passes through the openings, for example formed together with an outer casing (not shown) that encloses the screw pipe 110 and the plug pipe 130.

The plug obtained by the plug screw feeder serves as a sealing element between areas of different pressures. In general, the plug seals against an overpressure, for example in embodiments where the plug of pulp/chips output from the plug screw feeder (block arrow "OUT") is fed to a refiner. However, there are also applications where the pressure is higher at the input side of the plug screw feeder.

The inner surface 112 of the screw pipe 110, and possibly also the plug pipe 130, is provided with elongated protrusions (hereafter referred to as "bars") 114 to achieve efficient plug screw feeding. Such bars generally serve to facilitate forward motion of the flow of chips/pulp in the feed direction F, and to prevent rotation of the flow.

Figure 2:
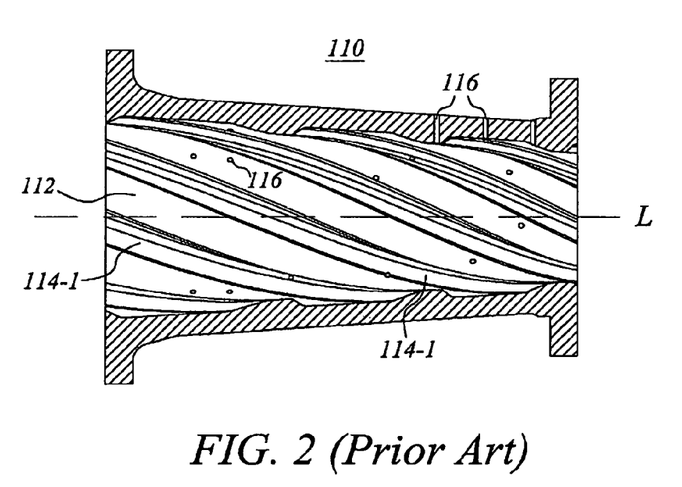
FIG. 2 is a side, elevational, cross-sectional view of a screw pipe unit in accordance with the prior art.

A screw pipe of the prior art intended to cooperate with and at least partly enclose a screw in a plug screw feeder is shown in FIG. 2. This prior art screw pipe 110 has spiral-shaped bars 114-1 on its inner surface 112, which is beneficial for the feeding of chips/pulp in the plug screw feeder. As compared to other known screw pipes, with straight bars parallel to the longitudinal axis of the screw pipe and plug screw feeder, a larger force component acting on the pulp/chips in the feeding direction F can be achieved by the inclination of the bars 114-1. The inclination of the bars 114-1 means that friction has less impact on the chips/pulp, resulting in improved feeding, whereby energy consumption, for example, can be reduced. However, as mentioned in the background section, a drawback of such so-called "spiral screw pipes" is that the dewatering function becomes less efficient.

Moreover, if a conventional straight bar plug pipe is arranged in connection with the screw pipe, the transition between screw and plug pipe will comprise an abrupt change from inclined to straight bars, which could cause problems. Removing the bars of the plug pipe would be one way of handling this but then the shape of the plug deteriorates and the compression of the plug/chips decreases. Another potential solution would be to also make the bars of the plug pipe spiral-shaped. However, this further reduces the dewatering of the plug screw feeder and it would also require a much more complicated and difficult manufacturing process if the plug pipe is to comprise slots or the like, which are typically cut, milled or spark-machined.

Figure 3A:
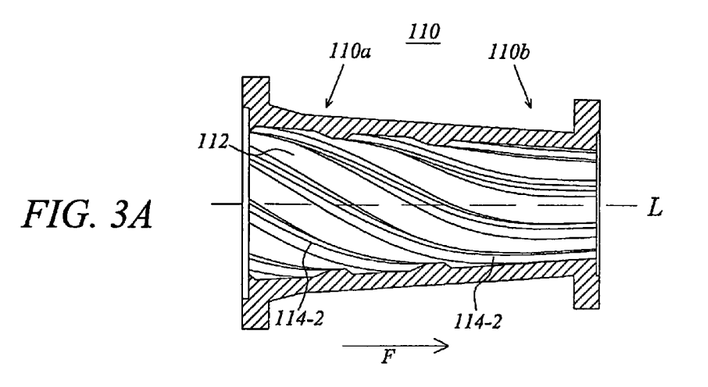
FIG. 3A is a side, elevational, cross-sectional view of a screw pipe unit in accordance with an exemplifying embodiment of the present invention.

In accordance with the present invention a screw pipe unit is instead proposed which has bars inclined or spiral shaped at the beginning (referring to the feed direction F) and in which the inclination then decreases in the feed direction, such that the bars are substantially straight and parallel to the longitudinal axis at a portion of the screw pipe closer to the end of the screw pipe. Such a screw pipe unit is, for example, shown in FIG. 3. The bars are inclined at a first portion 110*a* of the screw pipe unit and straight at a second portion 110*b* of the screw pipe unit, the second portion 110*b* being further away from an inlet end of the screw pipe unit than the first portion 110*a*. In this way, the pulp/chip flow is efficiently fed through the improved feeding effect of the inclined bars 114-2 at the first portion 110*a* of the screw pipe 110 and at a later stage in the screw pipe 110 the dewatering properties increase. Thus, the pulp/chips can be efficiently fed and dewatered by means of one and the same plug screw feeder. A further advantage is that a screw pipe 110 in accordance with the present invention with straight or almost straight bars near the pipe output end is suitable for being connected e.g. to a slotted plug pipe (130 in FIG. 1) with straight bars, whereby the plug formation and dewatering is further improved.

A screw pipe unit in accordance with the present invention is adapted, when arranged in a plug screw feeder, to at least partly enclose a threaded part of the screw. Typically, a substantial part of the screw portion enclosed by the screw pipe unit is threaded, and preferably practically the entire screw portion enclosed by the screw pipe unit is threaded. The screw pipe unit could, as illustrated in the drawings, be formed of one pipe element seen in the longitudinal direction or, alternatively, comprise two or more separate pipe elements (not shown) coupled together in series. Such a screw pipe unit can, for example, be connected to a plug pipe, which encloses an at least partly non-threaded part of the screw/axis. It is evident to the skilled person that several variants are possible, including those where the screw pipe unit comprises a screw pipe (or part of a screw pipe) formed together with the plug pipe.

Figures 3B, 3C:
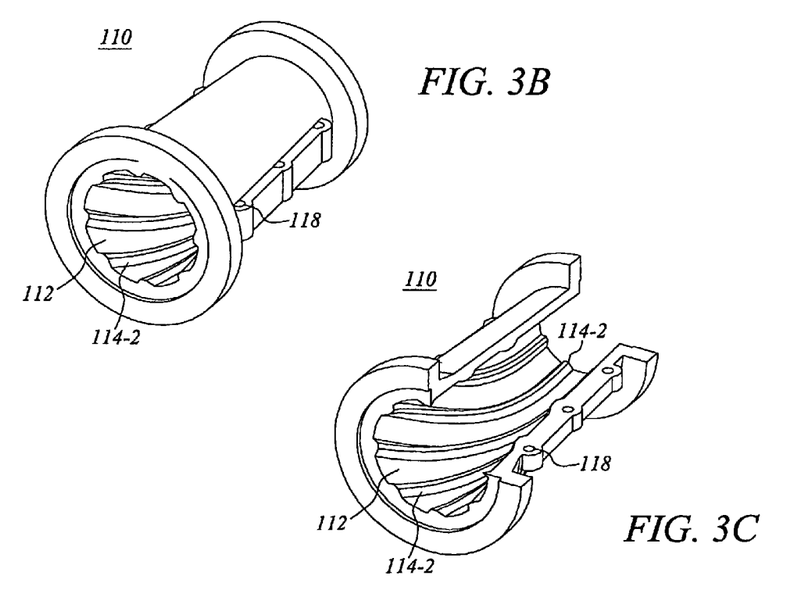
FIG. 3B is a front, perspective, partially schematic view of a screw pipe unit in accordance with an exemplifying embodiment of the present invention.
FIG. 3C is a front, perspective, partially schematic view of the screw pipe unit shown in FIG. 3B with a portion of the pipe wall being removed.
Figure 3D:
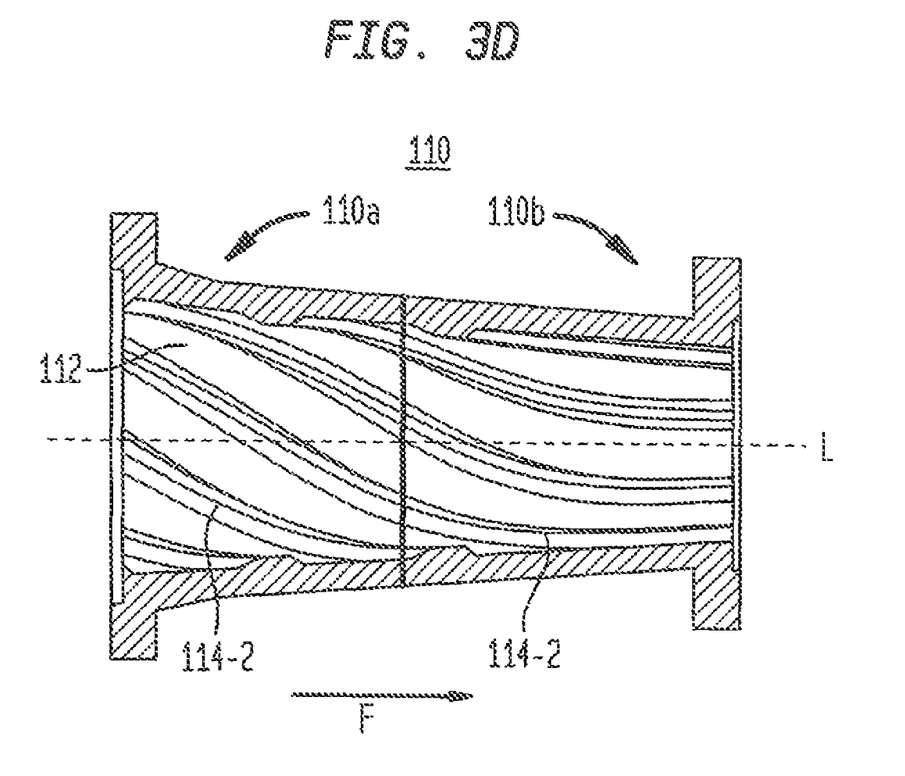
FIG. 3D is a front, perspective, partially schematic view of a screw pipe unit shown in FIG. 3A divided into two separate screw pipe portions.

In the circumferential direction, the screw pipe unit is preferably formed as two separate parts (see FIGS. 1, 3B, and 3C). When interconnected by appropriate fastening means, such as screw bolts (at 118), the parts form one substantially cylindrical screw pipe unit, which may be divided to facilitate installation and service. The cylindrical unit is typically tapered in the feed direction. Such a divisible screw pipe unit may with advantage comprise two identical cylinder halves, but other arrangements for dividing the screw pipe unit such that it can be mounted/dismounted by lifting one or more separate parts are possible, e.g. employing more than two separate parts in the circumferential direction and/or parts "cutting" the cylinder differently. Embodiments where the screw pipe unit is formed as a whole cylindrical (possibly tapering) element also lie within the scope of the present invention.

The bars 114-2 are provided on the screw pipe 110 using any suitable manufacturing method. Such a method can, for example, include welding the bars onto the inner surface 112 of the screw pipe (or screw pipe portion) or casting the bars integral with the screw pipe (or screw pipe portion).

Figure 4:
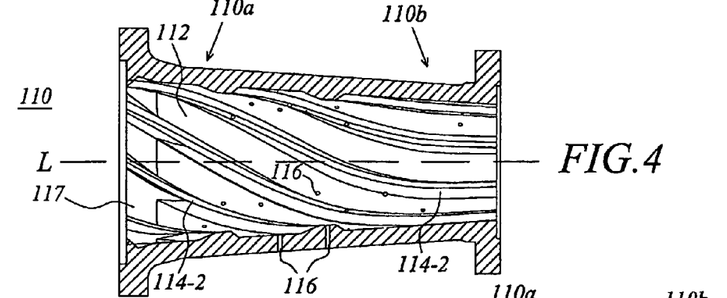
FIG. 4 is a side, elevational partially schematic cross-sectional view of a screw pipe unit in accordance with another exemplifying embodiment of the present invention.

The screw pipe unit according to the present invention has at least one and preferably a plurality of openings in the pipe wall so as to allow liquid dewatered from the chips/pulp to exit through the screw pipe wall. The opening(s) in the screw pipe wall were, for clarity, left out in FIG. 3A-C, but FIG. 4 shows a view corresponding to FIG. 3A with these openings included. The illustrated openings 116 comprise holes extending through the pipe wall. The skilled person understands that the number, shape and arrangement of these openings may vary within the scope of the present invention. There could, for example, be slots in the screw pipe instead of or in addition to the holes.

FIG. 4 also illustrates a feature which may optionally be included in a screw pipe unit of the present invention. At an input section 117, the screw pipe 110 widens, e.g. by adapted bars 114-2, to enlarge the space enclosed by the inner surface 112 of the screw pipe in the area around the inlet end. Such an enlarged space around the inlet end facilitates the feeding of media (cellulose pulp/chips) into the screw pipe 110, which leads to an enhanced capacity.

Figure 5:
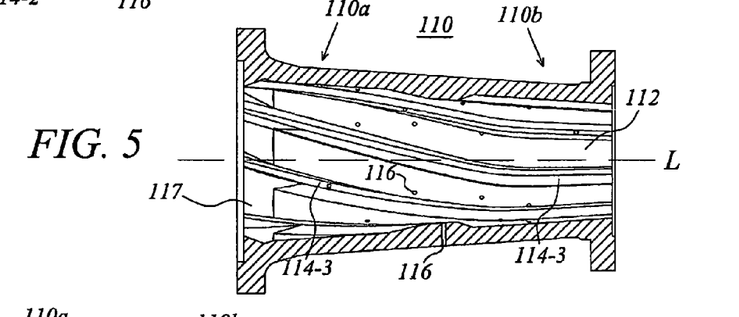
FIG. 5 is a side, elevational partially schematic cross-sectional view of a screw pipe unit in accordance with another exemplifying embodiment of the present invention.

In FIG. 5, another exemplifying embodiment of the present invention is shown, illustrating the fact that the angle of inclination of the bars with respect to the longitudinal axis L of the screw pipe can vary. The bars 114-3 according to this embodiment have a smaller angle of inclination at the first portion 110*a* of the screw pipe 110 as compared to the previously described embodiments.

The first portion of the screw pipe typically has bars with an angle of inclination with respect to the longitudinal axis in the range of from 10° to 60°. Specific embodiments have an angle of inclination with respect to the longitudinal axis of in the interval of from 15° to 35° at the beginning of the screw pipe. In order to obtain an inclination that will have an effect on the feeding, an angle of over 10° should be used. However, if the angle is too large, the bars might impede the feeding. The angle of inclination should therefore preferably not exceed 60°.

For optimal performance of the plug screw feeder, it is preferred that the inclination of the bars decreases in a substantially continuous manner, as illustrated in FIG. 3-5. In other words, if there are interruptions in the continuous decrease from a position with maximum inclination to a position with practically straight bars, such interruptions (i.e. portions where the inclination is constant or even increases) relate to portion(s) of the screw pipe of a limited extension in the longitudinal direction.

Figure 6:
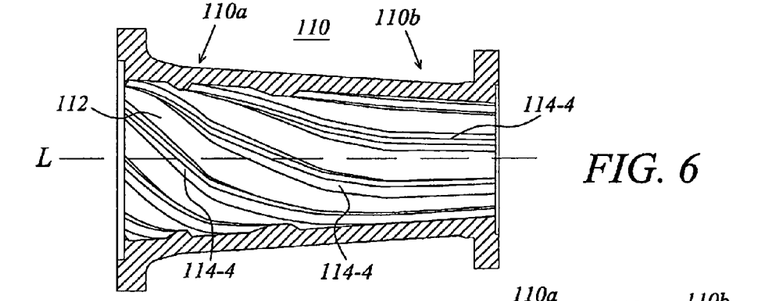
FIG. 6 is a side, elevational partially schematic cross-sectional view of a screw pipe unit in accordance with another exemplifying embodiment of the present invention.

Nevertheless, embodiments where the gradual decrease of the bar inclination instead is in the form of a stepwise decrease are also possible. This is illustrated in FIG. 6. The inclination of the respective bars 114-4 decreases in a plurality of steps (at least three but preferably more than three steps). Also in this case, there could be portion(s) where the inclination increases, as long as the overall impression of the bar pattern is that of a less and less angled spiral in the relevant pipe section.

Combinations of FIGS. 3-5 and FIG. 6 i.e. screw pipes with zones of continuous and stepwise inclination decrease, respectively, are also possible.

A gradual (or smooth) decrease in the bar inclination, such as in the embodiments of FIGS. 3-6, results in a screw pipe unit without any abrupt changes in the degree of inclination. The plug can be formed, transported and dewatered in the screw pipe in a smooth manner without disturbances caused by abrupt bar pattern changes. In particular, such a screw pipe unit can be used together with a conventional straight bar plug pipe in a plug screw feeder with most efficient feeding and dewatering and no abrupt bar transitions at all, neither in the screw pipe unit nor in the connection between the screw pipe unit and plug pipe unit.

Figure 7:
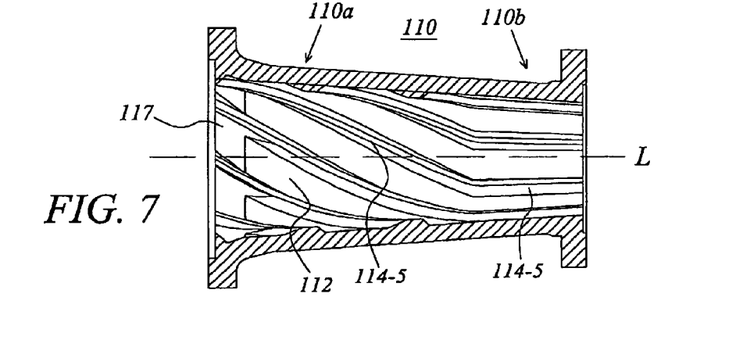
FIG. 7 is a side, elevational partially schematic cross-sectional view of a screw pipe unit in accordance with another exemplifying embodiment of the present invention.

FIG. 7 illustrates another embodiment, where the bars 114-5 go directly from maximum inclination (first portion 110a of screw pipe 110) to being substantially straight (second portion 110b) in one step. Like the previously described embodiments, such a variant may also provide for efficient feeding at the beginning and improved dewatering at a later section of the plug screw feeder. However, the embodiment of FIG. 7 could affect the shape and other properties of the plug in a negative manner due to the comparatively abrupt change in the degree of inclination. Therefore, a screw pipe unit with a gradual decrease in the bar inclination (stepwise or continuous) would normally be preferred, in order to obtain as efficient plug feeding as possible.

The actual length of the areas with inclined and straight bars, respectively, as well as the length of the preferred area of gradual decrease of the inclination, should be selected to suit the particular application anticipated. Generally, there will be a tradeoff between efficient feeding (large angle of inclination and/or large area with inclined bars) and efficient dewatering (large area with small/no inclination).

Figure 8:
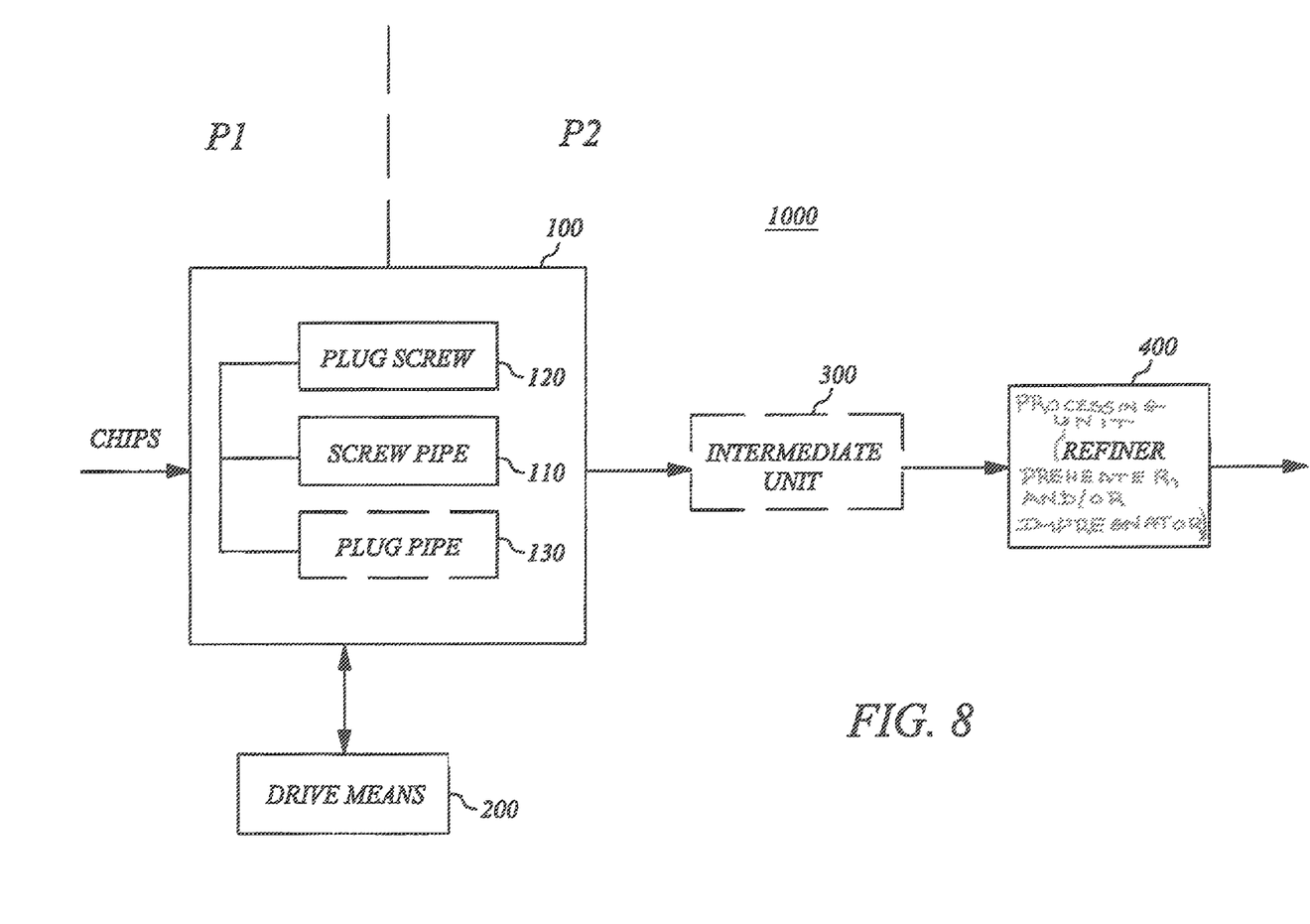
FIG. 8 is a top, elevational, schematic block diagram of a system for the treatment of cellulosic material according to an embodiment of the present invention.

FIG. 8 is a schematic block diagram of a system 1000 for treatment of cellulose chips/pulp according to an exemplifying embodiment of the present invention. In this example, the plug screw feeder 100 is arranged to provide a plug flow of chips to be input to a refiner 400. A flow of chips is input to the plug screw feeder 100, which in accordance with the previous description comprises a screw pipe 110, a screw 120, and an optional plug pipe 130 (preferably but not necessarily slotted). A drive means 200 for the plug screw feeder 100 rotates the screw 120 about a shaft. As indicated by a dashed line, the plug formed by the plug screw feeder 100 divides the processing system into a first area of pressure P1 and a second area of pressure P2. The pressure P2 on the refiner side is typically higher than the pressure P1 on the input side, but there are also applications where the pressure P1 on the input side is higher than the pressure P2 on the refiner side.

The system 1000 of FIG. 8 further comprises an optional intermediate unit 300 arranged between the plug screw feeder 100 and refiner 400 to illustrate the fact that the plug screw feeder 100 need not necessarily be arranged in direct connection with the refiner 400. There may be one or several intermediate units 300, for example transport units, which normally do not alter the plug flow created by the plug screw feeder 100 in any significant manner.

As mentioned, the plug screw feeder 100 can also be used to feed other processing units other than a refiner. The refiner 400 in FIG. 8 could in such a case, for example, be replaced by an impregnator or a preheater.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A screw pipe having a longitudinal axis, an inner surface, a first portion corresponding to an inlet end and a second portion distal from said first portion towards an outlet end, for at least partly enclosing a screw in a plug screw feeder for cellulosic material, said screw pipe including at least one opening between said inlet end and said outlet end for the removal of filtrate dewatered from said cellulosic material, and a plurality of bars disposed on said inner surface, said plurality of bars being inclined with respect to the longitudinal axis of said screw pipe at an angle of inclination with respect to said longitudinal axis of said screw pipe which decreases in the longitudinal direction from said inlet end to said outlet end, said angle of inclination of said plurality of bars at said first portion of said screw pipe comprising a maximum angle of inclination, and said plurality of bars throughout an entire length of said second portion of said screw pipe being substantially parallel to said longitudinal axis of said screw pipe.

2. The screw pipe of claim 1 wherein said plurality of bars at said first portion of said screw pipe are substantially helical.

3. The screw pipe of claim 1 wherein said angle of inclination of said plurality of bars gradually decreases from said first portion of said screw pipe to said second portion of said screw pipe.

4. The screw pipe of claim 3 wherein said angle of inclination of said plurality of bars gradually substantially continuously decreases from said first portion of said screw pipe to said second portion of said screw pipe.

5. The screw pipe of claim 3 wherein said angle of inclination of said plurality of bars gradually decreases in the form of a plurality of steps from said first portion of said screw pipe to said second portion of said screw pipe.

6. The screw pipe of claim 1 wherein said angle of inclination of said plurality of bars in said first portion of said screw pipe comprises an angle of from 10° to 60°.

7. The screw pipe of claim 6 wherein said angle of inclination of said plurality of bars in said first portion of said screw pipe comprises an angle of from 15° to 35°.

8. The screw pipe of claim 1 comprising a single pipe element.

9. The screw pipe of claim 1 comprising a plurality of pipe elements coupled together in series.

10. The screw pipe of claim 1 comprising the plurality of pipe elements coupled together longitudinally.

11. A plug screw feeder for feeding cellulosic material comprising a screw and a screw pipe having a longitudinal axis, an inner surface, a first portion corresponding to an inlet end and a second portion distal from said first portion towards an outlet end, for at least partly enclosing the screw in the plug screw feeder for cellulosic material, said screw pipe including at least one opening between said inlet end and said outlet end for the removal of filtrate dewatered from said cellulosic material, and a plurality of bars disposed on said inner surface of said screw pipe, said plurality of bars being inclined with respect to the longitudinal axis of said screw pipe at an angle of inclination with respect to said longitudinal axis of said screw pipe which decreases in the longitudinal direction from said inlet end to said outlet end, said angle of inclination of said plurality of bars at said first portion of said screw pipe comprising a maximum angle of inclination, and said plurality of bars throughout an entire length of said second portion of said screw pipe being substantially parallel to said longitudinal axis of said screw pipe.

12. The plug screw feeder of claim 11 including a plug pipe having an inner surface connected to said screw pipe, said plug pipe including a plurality of bars disposed on said inner surface substantially parallel to said longitudinal axis of said screw pipe.

13. The plug screw feeder of claim 11 including a processing unit for feeding said cellulosic material from said screw pipe thereto.

14. The plug screw feeder of claim 13 wherein said processing unit is selected from the group consisting of a refiner, a preheater and an impregnator.

15. Use of a plug screw feeder comprising a screw and a screw pipe having a longitudinal axis, an inner surface, a first portion corresponding to an inlet end and a second portion distal from said first portion towards an outlet end, for at least partly enclosing the screw in the plug screw feeder for cellulosic material, said screw pipe including at least one opening between said inlet end and said outlet end for the removal of filtrate dewatered from said cellulosic material, and a plurality of bars disposed on said inner surface of said screw pipe, said plurality of bars being inclined with respect to the longitudinal axis of said screw pipe at an angle of inclination with respect to said longitudinal axis of said screw pipe which decreases in the longitudinal direction from said inlet end to said outlet end, said angle of inclination of said plurality of bars at said first portion of said screw pipe comprising a maximum angle of inclination, and said plurality of bars throughout an entire length of said second portion of said screw pipe being substantially parallel to said longitudinal axis of said screw pipe for feeding cellulosic material to a refiner.

* * * * *